Aug. 9, 1949.                E. M. SPLAINE                2,478,334
            TEMPLE HINGE CONNECTION FOR OPHTHALMIC MOUNTINGS
Filed May 28, 1945                                2 Sheets-Sheet 2
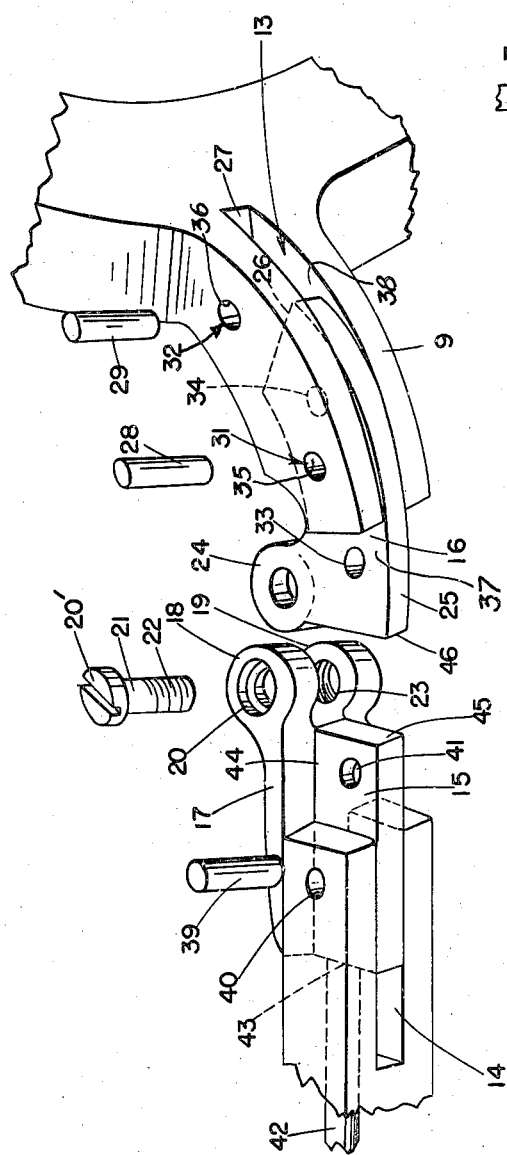
INVENTOR.
EDWARD M. SPLAINE
BY
ATTORNEY Patented Aug. 9, 1949

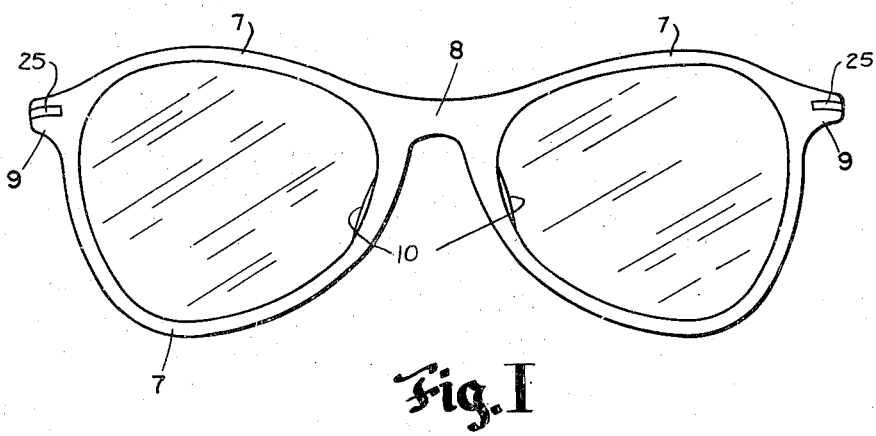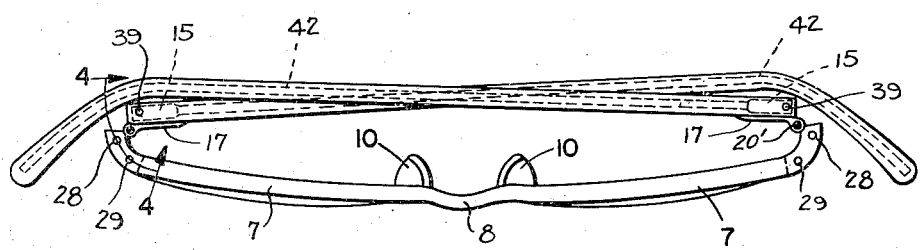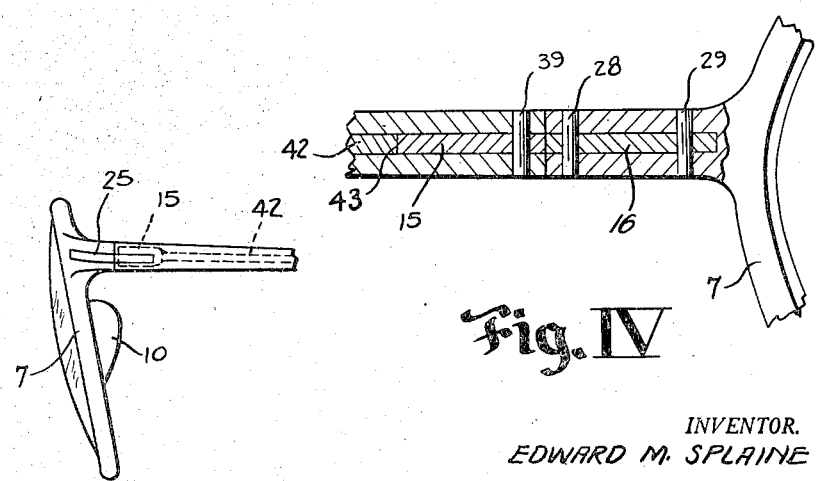

2,478,334

UNITED STATES PATENT OFFICE 2,478,334

TEMPLE HINGE CONNECTION FOR OPHTHALMIC MOUNTINGS

Edward M. Splaine, Southbridge, Mass., assignor to American Optical Company, Southbridge, Mass., a voluntary association of Massachusetts Application May 28, 1945, Serial No. 596,364

2 Claims. (Cl. 88—53)

This invention relates to improvements in ophthalmic mountings and is directed particularly to an improved temple and endpiece construction.

One of the principal objects of the invention is to provide a novel hinge construction for the temple and endpiece of an ophthalmic mounting.

Another object is to provide novel means of securing a plate hinge member to the temple and endpiece of an ophthalmic mounting formed of non-metallic material whereby the connected parts will be more positively retained in desired relation with each other and the means for securing said parts in said relation will be more positively and securely united with said parts being substantially invisible in the completed structure.

Another object is to provide a hinge construction of the above nature whereby the abutting portions of the temple and endpiece will be retained in proper relation with each other through the provision of abutting portions formed on the metallic hinge member and disposed in substantially flush relation with the abutting surfaces of the temple and endpiece.

Another object is to provide a hinge member embodying metallic hinge plates secured within slotted portions formed in the temple and endpiece of a non-metallic mounting and to secure said metallic hinge plates in said slotted portions by non-metallic anchor members extending within aligned openings formed in the temple and endpiece and in the hinge plates with the said non-metallic anchoring members being secured throughout the length thereof on the opposed side of said hinge plates in integrally bonded relation with the material of the slotted temple and endpiece whereby a more positive connection of said hinge plates with said temple and endpiece is obtained with the said non-metallic anchor members being substantially invisible in the finished structure.

Other objects and advantages of the invention will become apparent from the following description taken in connection with the accompanying drawings and it will be seen that many changes may be made in the details of construction and arrangement of parts shown and described without departing from the spirit of the invention as expressed in the accompanying claims. I, therefore, do not wish to be limited to the exact details of construction and arrangement of parts shown and described as the preferred form only has been given by way of illustration.

Referring to the drawings:

Fig. 1 is a front elevational view of an ophthalmic mounting embodying the invention;

Fig. 2 is a top plan view of the mounting illustrated in Fig. 1;

Fig. 3 is a fragmentary side elevational view of said mounting;

Fig. 4 is an enlarged fragmentary sectional view taken as on line 4—4 of Fig. 2 and looking in the direction indicated by the arrows;

Fig. 5 is an enlarged fragmentary perspective view showing the various parts in disassociated relation with each other; and Fig. 6 is a fragmentary view of a modified form of the invention.

The present invention is directed more particularly to the provision of a hinge connection for the temples and endpieces of ophthalmic mountings formed particularly of non-metallic material such as cellulose nitrate, cellulose acetate or other known artificial plastic or resinous materials. In the past much difficulty has been encountered in providing a hinge connection for mountings of the above character which will properly retain the temples in adjusted position, which will be durable and which will be desirable from the aesthetical viewpoint.

In most instances, in order to obtain the strength and durability required, such hinge members had to be made relatively large in proportion to the remainder of the mounting and required a particular connection with a non-metallic material which, due to the inherent transparency of such materials, caused the areas of greatest dimension of said hinge members to be readily visible when the mounting was in position of use on the face.

The present invention is directed particularly to overcoming the above difficulties while providing greater contact surface area between the hinge member and the parts of the mounting to which said hinge member is attached and which will cause the area of smallest dimension of the hinge member to be visible.

Referring more particularly to the drawings wherein like characters of reference designate like parts throughout the several views, a typical mounting with which the invention is embodied as shown in Figs. 1 through 3 comprises a pair of rim members 7 joined by an integral bridge member 8 and having integral endpieces 9 and nose pads 10 all formed of non-metallic material such as cellulose nitrate, cellulose acetate or other known artificial plastic or resinous materials. The integrally related parts such as set forth above are commonly known in the art as a front and may be formed by blanking the said related parts simultaneously from sheet material or may be formed by injection molding or the like.

The invention in the present instance is directed particularly to the temple hinge connections with the endpieces 9. The endpieces 9 are preferably formed so as to curve rearwardly with respect to the lens rims 7 as shown in Figs. 2 and 5.

This rearward curving of the endpieces, in instances when the front is formed by blanking from sheet material, may be accomplished by heating and bending the endpieces rearwardly and allowing them to set while held to the curved shape desired or as shown in Fig. 6 may be formed by cementing or otherwise securing a block of plastic material 11 to the rear surface of the endpiece 9 and thereafter milling the endpiece to the curved shape desired as illustrated by the dash lines 12.

The endpieces 9, after having been formed to the rearwardly curved shape as shown in Figs. 2 and 6, are provided with a longitudinal slot 13 disposed substantially in the direction of the horizontal plane of said endpieces.

The temple butt is also provided with a longitudinal slot 14. The slots 13 and 14 are adapted to receive the hinge plate members 15 and 16. The hinge plate 15 is secured to or may be formed integrally with a backing member 17 having spaced hinge ears 18 and 19 thereon. The hinge ear 18 has a shouldered opening 20 therein adapted to receive the head 20' of a pivot connection screw 21. The threaded portion 22 of said screw is adapted to be threaded within the threaded bore 23 of the hinge ear 19. The plate 16 is provided with a hinge ear 24 adapted to be positioned between the hinge ears 18 and 19 and to be pivotally secured thereto by the screw 21.

The plate 16 has an outer edge surface 25 shaped to the curvature of the outer surface of the endpiece 9. The said plate is adapted to be fitted within the slot 13 with the rear edge 26 thereof intimately engaging the base 27 of the slot and is secured in said slot by non-metallic pin members 28 and 29. The pin members are adapted to extend through aligned openings 31, 32, 33 and 34 formed in the endpiece 9 and in the hinge plate 16. The said pins are formed of substantially the same material as the endpiece 9 and are secured in said aligned openings by a suitable solvent or adhesive which causes the adjacent side surfaces 35 and 36 of the openings 31 and 32 and the pin members 28 and 29 to be integrally bonded with each other. If desired a suitable adhesive may be placed between the side surfaces 37 and 38 of the hinge plate 16 and the slot 13. The hinge plates 15 and 16, however, are preferably formed of metal so that there will be no integral bonding of the materials of the hinge plate and endpiece 9 such as takes place between the contiguous surfaces 35 and 36 of the openings 31 and 32 and non-metallic pin members 28 and 29. The outer opposed ends of the pins 28 and 29 are finished off flush with the adjacent outer surfaces of the endpiece 9.

The hinge plate 15 is secured internally of the slot 14 by means of a pin member 39 which, like the pin members 28 and 29, is formed of non-metallic material which is substantially the same as the material of the end of the temple having the slot 14 therein. The pin 39 extends through aligned openings 40 and 41 formed in said temple and in the plate 15 and is secured to the adjacent side surfaces of the openings 40 and 41 by a suitable cement, solvent or adhesive which, like the pins 28 and 29, will cause the portions of said pin 39 on the opposed sides of the plate 15 to be integrally joined with the material of the temple. Due to the fact that the plate 15 is formed of metal there will only be an adhering action between the pin and the plate within the opening 41.

The plate 15, like the plate 16, may be adhesively secured within the recess 14. Due to the fact that the hinge plate 15 is formed of metal, there will be no integral bonding between the surfaces but there will be an adhesion.

Due to the fact that the pins 28, 29 and 39 are formed of substantially the same material as the temple and endpiece and that there is an integral bond of said pin members with the adjacent side surfaces of the openings in which they are positioned, the said pin members will more firmly retain the plates in position in the slots 13 and 14 and there will be a continuous transparency of the material on both sides of the plates rendering the said pins substantially invisible.

The hinge plate 15 is secured to a metallic core 42 which lies within a longitudinal opening in the non-metallic temple. The said plate 15 is secured to the metallic core 42 as illustrated at 43 as by soldering, welding or the like. This firmly anchors the plate 15 in the slot 14 when the parts are assembled and the pin 39 is secured in place.

The backing member 17 as stated above is formed of metal and is secured to the plate 15 along the abutting surface 44 as by soldering, welding or the like or the said plate 15 may be formed integral with said backing member 17. This provides means whereby the hinge ears 18 and 19 may be formed with the slot therebetween receiving the hinge ear 24. The abutting end surfaces 45 and 46 of the hinge plates, when the parts are assembled, are adapted to control the set-back of the temple and provide durable means for limiting the temples in their outermost position when swung about the pivot screw 21. The set-back may be controlled to permit the temple to swing outwardly a greater amount by removing material from one of said abutting surfaces 45 or 46 and the adjacent abutting end surfaces of the temple and endpiece as by filing or the like.

The plates 15 and 16 are preferably formed by blanking said plates from sheet material and the openings 33, 34 and 41 are preferably formed by piercing. These openings are formed in the plates prior to their being positioned within the slots 13 and 14. It is to be understood, however, that they may be formed by drilling if desired. The openings 31, 32 and 40 are also formed in the temple and endpiece prior to positioning the plates in the slots. Care is taken that the said openings are in substantial alignment when the plates are in proper position in the slots. Prior to placing the pin members 28, 29 and 39 in the openings, the said plates are positioned in the slots 13 and 14 and the openings are reamed in order to insure proper or more positive alignment. The pins and openings are then treated with a suitable solvent or adhesive and the pins are then forced into said openings and are allowed to set in this position. The opposed end surfaces of the pins are then finished off flush with the adjacent upper and lower surfaces of the temple and endpiece.

If desired the pins may be formed with a slight taper in which instance a tapered ream is used prior to placing the pins in the aligned openings.

It is particularly pointed out that the plates are carefully formed to the shape of the temple and endpiece so that the outer exposed surfaces thereof are in flush relation with the adjacent outer surfaces of the said temple and endpiece. In the finished product, therefore, only a relatively thin metallic surface is visible as shown in Figs. 1 and 3.

The assembled parts are in more positively bonded relation with each other as there is a greater area of contact between the surfaces of the plates and the temple and endpiece and due also to the more positive bond of the anchor means with the material of the temple and endpiece which bond is throughout the entire length of the anchor pins. This, therefore, provides much greater strength and durability than is obtainable with prior art metal anchor pins as such metal anchor pins were required to be headed over and introduced a clamping holding action rather than an integral bond such as is obtained by the use of non-metallic pins formed of substantially the same material as the temple and endpieces. A more positive bond is insured by adhesively securing the hinge plates within the slotted portions of the temple and endpiece.

In order to render the metallic hinge plates less visible when in assembled relation with the temple and endpiece, the outer surfaces of the plates may be polished and the inner surfaces of the slot may likewise be polished or provided with a smooth texture.

After the parts have been secured in assembled relation with each other, the outer surfaces may be finished in the usual manner to cause the outer adjacent surfaces of the parts to be in relatively smooth flush relation with each other and to have the desired polish and luster.

The metallic core 42 of the temple is secured to the hinge plate 15 prior to assembling said plate and core with the outer main non-metallic portion of the temple. This preferably is accomplished by forming the outer main non-metallic portion in two sections and cementing or otherwise securing said sections together throughout the length thereof with the core 42 therebetween, it being understood, of course, that the slot 14 is preformed to receive the plate 15.

In instances when less transparent or substantially opaque plastic material is used, the outer surfaces of the hinge plate and the surfaces in the slot are not of necessity formed smooth or polished as the problem of visibility does not exist.

Due to the fact that only the area of smaller dimension is visible when the mounting is on the face of the wearer, the said hinge members will be much less conspicuous than with prior art constructions having their hinge members secured to the rear or inner surfaces of the temple and endpiece.

From the foregoing description, it will be seen that simple, efficient and economical means and method have been provided for accomplishing all of the objects and advantages of the invention.

Having described my invention, I claim:

1. In a spectacle frame, the combination of a pair of lens rims each having a temple endpiece of non-metallic material thereon, said endpieces being curved outwardly and rearwardly of the lens rims, with the inner and outer surfaces of the endpieces being of substantially concentrically curved shapes, said endpieces having longitudinal substantially horizontally disposed slots therein, said slots each having a relatively flat base wall adjacent a line forming a continuation of the adjacent outer contour shape of the lens rims, said slots extending laterally throughout the width of the endpieces and dividing said endpieces into relatively long separated non-metallic portions on either side thereof, said separated portions having their inner surfaces disposed substantially parallel and spaced a given distance apart, said separated portions being initially yieldingly movable toward each other throughout the major portion of the lengths thereof, and a metallic hinge plate seated in each of said slots and between said separated non-metallic portions of the endpieces, said hinge plates having substantially parallel opposed surfaces and a thickness approximately equal to the normal distance between the parallel inner surfaces of the separated portions, said hinge plates having one end fitted in contiguous relation with the flat base wall of the slots and having their opposed end terminating in a perforated hinge ear, and the outer and inner side edges of the hinge plates being of substantially the same shape and in flush relation with the inner and outer side surfaces of the endpieces, said non-metallic portions of the endpieces, on either side of the respective hinge plates, each having a pair of spaced openings of substantially uniform size and circular shape, one adjacent each of the opposed ends of said non-metallic portions and in substantial alignment with each other, said openings being disposed substantially equidistantly from and on the opposed sides of a line radial with the centers of the curvatures of the side surfaces of the endpieces, and intersecting the slotted areas of the endpieces substantially midway of the ends thereof, said hinge plates each having a pair of openings in substantial alignment with the aligned openings in the non-metallic portions of the endpieces and of substantially the same shape and size, and cylindrically shaped pins of non-metallic material substantially similar to the material of the endpieces fitted within said aligned openings in the non-metallic portions and the hinge plates and extending across the lines of junction between the hinge plate and the separated portions of the endpieces on either side thereof, said pins having their opposed ends in substantially flush relation with the upper and lower outer surfaces of the endpieces, and having their cylindrical wall portions integrally joined to the adjacent walls of the openings in the non-metallic portions of the endpieces throughout the widths thereof on either side of the hinge plates whereby the body of said pins will provide resistance to a shearing action exerted along said lines of junction between said hinge plates and the non-metallic portions of the endpiece on opposed sides thereof when torsional strain is exerted on the hinge plates by temples pivotally connected to the hinge ears thereof.

2. In a spectacle frame, the combination of a pair of lens rims each having a temple endpiece of non-metallic transparent material thereon, said endpieces being curved outwardly and rearwardly of the lens rims, with the inner and outer surfaces of the endpieces being of substantially concentrically curved shapes, said endpieces having longitudinal substantially horizontally disposed slots therein, said slots each having a relatively flat base wall adjacent a line forming a continuation of the adjacent outer contour shape of the lens rims, said slots extending laterally throughout the width of the endpieces dividing said endpieces into relatively long separated non-metallic portions on either side thereof, said separated portions having their inner surfaces disposed substantially parallel and spaced a given distance apart and said separated non-metallic transparent portions being initially yieldingly movable toward each other throughout the major portion of the lengths thereof, and a metallic hinge plate seated in each of said slots and between said separated non-metallic portions of the endpieces, said hinge plates having substantially parallel opposed surfaces and a thickness substantially equal to the normal distance between the parallel inner surfaces of the slots, said hinge plates having one end fitted in contiguous relation with the flat base wall of the slots and having their opposed end terminating in a perforated hinge ear, and the outer and inner side edges of the hinge plates being of substantially the same shape and in flush relation with the inner and outer side surfaces of the endpieces, said non-metallic portions of the endpieces, on either side of the respective hinge plates, each having a pair of spaced openings of substantially uniform size and circular shape, one adjacent each of the opposed ends of said non-metallic portions and in substantial alignment with each other, said openings being disposed substantially equidistantly from and on the opposed sides of a line radial with the centers of the curvatures of the side surfaces of the endpieces, and intersecting the slotted areas of the endpieces substantially midway of the ends thereof, said hinge plates each having a pair of openings in substantial alignment with the aligned openings in the non-metallic portions of the endpieces and of substantially the same size and shape, and cylindrically shaped pins of non-metallic transparent material substantially similar to the material of the endpieces fitted within said aligned openings in the non-metallic portions and the hinge plates and extending across the lines of junction between the hinge plate and said portions, said pins having their opposed ends in substantially flush relation with the upper and lower outer surfaces of the endpieces, and having their cylindrically shaped walls adhesively secured throughout their length to the adjacent material of the hinge plates about the openings therein and integrally bonded to the adjacent wall of the openings in the non-metallic portions of the endpieces throughout their widths, whereby the body of said pins will provide resistance to shearing action exerted along said lines of junction between said hinge plates and the opposed non-metallic portions of the endpieces when torsional strain is exerted on the hinge plates by temples pivotally connected to the hinge ears thereof, and the adjacent surfaces of the hinge plates and the non-metallic portions having a sufficiently smoothed texture as to cause the hinge plates to be substantially invisible through the transparent non-metallic material of the endpieces.

EDWARD M. SPLAINE.

REFERENCES CITED

The following references are of record in the file of this patent:

UNITED STATES PATENTS

| Number | Name | Date |
|---|---|---|
| 1,585,836 | Durgin | May 25, 1926 |
| 2,243,767 | Nerney | May 27, 1941 |
| 2,300,834 | Spooner | Nov. 3, 1942 |

FOREIGN PATENTS

| Number | Country | Date |
|---|---|---|
| 763,805 | France | Feb. 19, 1934 |
| 465,678 | Great Britain | May 13, 1937 |
| 470,666 | Great Britain | Aug. 19, 1937 |
| 484,725 | Great Britain | May 10, 1938 |